US012750256B2

(12) United States Patent
Kim et al.

(10) Patent No.: US 12,750,256 B2
(45) Date of Patent: Sep. 29, 2026

(54) DEVICE AND METHOD FOR CHANNEL ESTIMATION USING SHORT/LONG-TERM MEMORY NETWORK IN MILLIMETER-WAVE COMMUNICATION SYSTEM

(71) Applicants: Samsung Electronics Co., Ltd., Suwon-si (KR); SEOUL NATIONAL UNIVERSITY R&DB FOUNDATION, Seoul (KR)

(72) Inventors: Kyeongyeon Kim, Suwon-si (KR); Won Jun Kim, Seoul (KR); Jin Hong Kim, Seoul (KR); Byong Hyo Shim, Seoul (KR); Yong Jun An, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 283 days.

(21) Appl. No.: 18/584,561

(22) Filed: Feb. 22, 2024

(65) Prior Publication Data

US 2024/0195662 A1 Jun. 13, 2024

Related U.S. Application Data

(63) Continuation of application No. PCT/KR2022/009832, filed on Jul. 7, 2022.

(30) Foreign Application Priority Data

Aug. 26, 2021 (KR) ........................ 10-2021-0112977

(51) Int. Cl.
*H04L 25/02* (2006.01)

(52) U.S. Cl.
CPC ................................ *H04L 25/0254* (2013.01)

(58) Field of Classification Search
CPC .................................................. H04L 25/0254
See application file for complete search history.

(56) References Cited

U.S. PATENT DOCUMENTS

2020/0235875 A1 7/2020 Sha et al.
2021/0194733 A1 * 6/2021 Huangfu ............ H04L 25/0214
(Continued)

FOREIGN PATENT DOCUMENTS

CN 109450830 A 3/2019
CN 111786923 A 10/2020
(Continued)

OTHER PUBLICATIONS

NPL Document, Deep Neural network-Based Joint Active User Detection and Channel Estimation for mMTC (Year: 2020).*
(Continued)

*Primary Examiner* — Mewale A Ambaye
(74) *Attorney, Agent, or Firm* — Jefferson IP Law, LLP

(57) ABSTRACT

A device and a method for channel estimation using a short/long-term memory network in a millimeter-wave (mmWave) communication system are provided. The channel estimation method includes the operations of inputting a received pilot signal of a time slot to a long short-term memory network, extracting a time-varying channel feature embedding vector by estimating a change state of a channel by using the received pilot signal of the time slot as an input in the long short-term memory network, estimating a parameter of a channel model by using the time-varying channel feature embedding vector as an input in a fully connected network, and estimating a channel for the received pilot signal of the time slot, using the parameter of the channel model.

20 Claims, 5 Drawing Sheets

(56) References Cited

U.S. PATENT DOCUMENTS

| | | | | |
|---|---|---|---|---|
| 2023/0412230 | A1* | 12/2023 | Saber | G06N 20/10 |
| 2024/0080227 | A1* | 3/2024 | Choi | H04L 25/0254 |
| 2024/0275642 | A1* | 8/2024 | Jiang | H04L 25/0254 |

FOREIGN PATENT DOCUMENTS

| | | | | |
|---|---|---|---|---|
| CN | 112968847 | A | 6/2021 | |
| KR | 10-2067114 | B1 | 1/2020 | |
| KR | 102154481 | B1 * | 9/2020 | H04L 25/0254 |

OTHER PUBLICATIONS

Ahn et al.; Deep Neural Network-based Joint Active User Detection and Channel Estimation for mMTC; IEEE; 2020.

Liao et al.; 7. ChanEstNet A Deep Learning Based Channel Estimation for High-Speed Scenarios; IEEE; 2019.

Seo et al.; Deep Learning-based Millimeter Wave Band Channel Estimation Technique and Performance Analysis; www.dbpia.co.kr; Incheon, KR; 2020.

International Search Report with Written Opinion dated Oct. 6, 2022; International Patent Application No. PCT/KR2022/009832.

Kim et al.; Deep Neural Network Based Active User Detection for Grant-free NOMA Systems; arXiv:1912.11782v1 [eess.SP] Dec. 26, 2019; Apr. 30, 2020.

Korean Office Action with English translation dated Aug. 4, 2025; Korean Appln. No. 10-2021-0112977.

Luo et al.; Channel State Information Prediction for 5G Wireless Communications A Deep Learning Approach; IEEE Transactions on Network Science and Engineering; vol. 7, No. 1; Jan.-Mar. 2020.

Lim et al.; Deep Learning-Based Beam Tracking for Millimeter-Wave Communications Under Mobility; IEEE Transactions on Communications; vol. 69, No. 11; Nov. 2021.

Extended European Search Report dated Nov. 15, 2024; European Appln. No. 22861543.1-1206 / 4376366 PCT/KR2022009832.

* cited by examiner

DEVICE AND METHOD FOR CHANNEL ESTIMATION USING SHORT/LONG-TERM MEMORY NETWORK IN MILLIMETER-WAVE COMMUNICATION SYSTEM

CROSS-REFERENCE TO RELATED APPLICATION(S)

This application is a continuation application, claiming priority under § 365(c), of an International Application No. PCT/KR2022/009832 filed on Jul. 7, 2022, which is based on and claims the benefit of a Korean patent application number 10-2021-0112977 filed on Aug. 26, 2021 in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd. and 2) Seoul National University R&DB Foundation.

BACKGROUND

1. Field

The disclosure relates to a device and method for estimating a channel in a millimeter-wave (mmWave) communication system.

2. Description of Related Art

Since a millimeter-wave (mmWave) communication system employs a high frequency band (30 gigahertz (GHz) to 300 GHz) unlike existing fourth generation long term evolution (4G LTE) systems, the propagation of mmWave communication is highly attenuated depending on the distance. To offset such a disadvantage, a beamforming scheme through a multiple input multiple output (MIMO) system using a plurality of antennas is used in the mmWave communication system. Here, a channel coefficient that needs to be estimated in the MIMO system increases in proportion to the number of antennas in a receiver and a transmitter. To use a least square method or a minimum mean square error method that is an existing channel estimation method, in the MIMO system, pilot transmission overhead occurs because at least the same number of pilots as the number of channel coefficients need to be transmitted.

To reduce the pilot transmission overhead, research is being conducted on channel estimation methods using various schemes such as compressive sensing, MUSIC, deep learning schemes, and the like.

The above information is presented as background information only to assist with an understanding of the disclosure. No determination has been made, and no assertion is made, as to whether any of the above might be applicable as prior art with regard to the disclosure.

SUMMARY

According to various embodiments disclosed in the disclosure, a channel may be estimated from pilot signals received in units of time slots, using a long short-term memory network and a fully connected network.

Aspects of the disclosure are to address at least the above-mentioned problems and/or disadvantages and to provide at least the advantages described below. Accordingly, an aspect of the disclosure is to provide a device and method for channel estimation using short/long-term memory network in millimeter-wave communication system.

Additional aspects will be set forth in part in the description which follows and, in part, will be apparent from the description, or may be learned by practice of the presented embodiments.

In accordance with an aspect of the disclosure, a channel estimation method is provided. The channel estimation method includes inputting a received pilot signal of a time slot to a long short-term memory network, extracting a time-varying channel feature embedding vector by estimating a change state of a channel by using the received pilot signal of the time slot as an input in the long short-term memory network, estimating a parameter of a channel model by using the time-varying channel feature embedding vector as an input in a fully connected network, and estimating a channel for the received pilot signal of the time slot, using the parameter of the channel model.

In accordance with another aspect of the disclosure, a channel estimation device is provided. The channel estimation device includes memory storing one or more computer programs and one or more processors communicatively coupled to the memory. The one or more computer programs include computer-executable instructions that, when executed by the one or more processors, cause the channel estimation device, when a received pilot signal of a time slot is input, extract, by a long short-term memory network, a time-varying channel feature embedding vector by estimating a change state of a channel by using the received pilot signal of the time slot as an input, estimate, by a fully connected network, a parameter of a channel model by using the time-varying channel feature embedding vector as an input, and estimate, by a channel reproduction unit, a channel for the received pilot signal of the time slot, using the parameter of the channel model are included.

According to an embodiment, a receiver includes a coupling unit configured to obtain a received pilot signal by multiplying a combining matrix by a signal received through an antenna, a channel estimation device configured to estimate a channel from pilot signals received in units of time slots, using a long short-term memory network and a fully connected network, an equalizer configured to correct a distortion in the pilot signals received in units of time slots, a demodulation unit configured to demodulate the corrected signal, and a decoding unit configured to decode the demodulated signal.

According to various embodiments, a device and method for estimating a channel from pilot signals received in units of time slots, using a long short-term memory network and a fully connected network are provided, and accurate parameters may be estimated in a situation in which a communication channel changes over time because a parameter of a geometric channel is estimated in a continuous domain through sequentially received pilot signals. In addition, since the parameters are estimated in a time domain instead of a frequency domain, channels for all subcarriers is estimated using a geometric channel model and Fourier transform.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a device and method for channel estimation using a long short-term memory network in a millimeter-wave (mmWave) communication system according to an embodiment of the disclosure is described in detail with reference to FIGS. 1 to 5.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
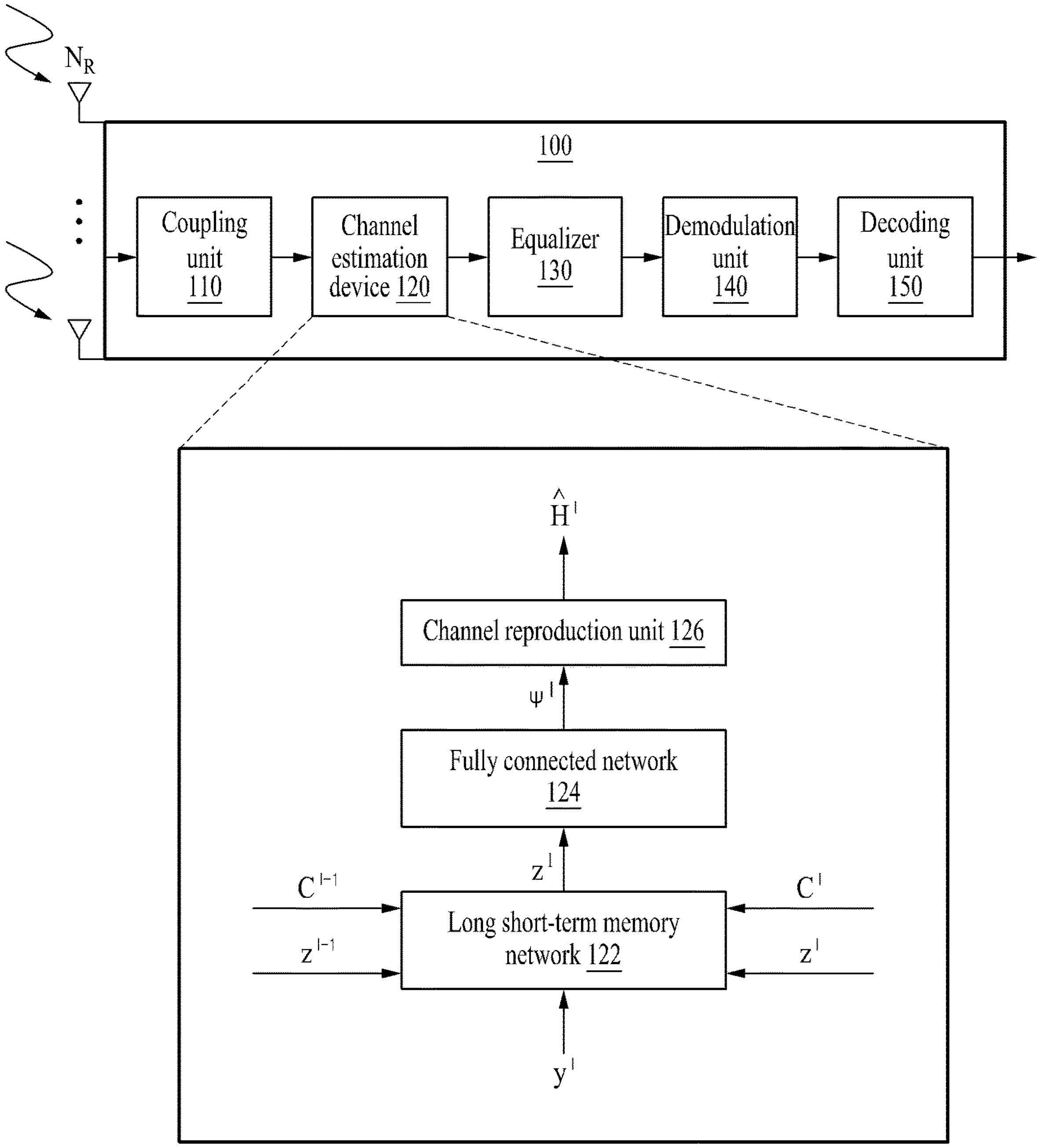
FIG. 1 schematically illustrates a configuration of a receiver of a millimeter-wave (mmWave) communication system including a channel estimation device to estimate a channel using a long short-term memory network according to an embodiment of the disclosure.

FIG. 1 schematically illustrates a configuration of a receiver of a mmWave communication system including a channel estimation device to estimate a channel using a long short-term memory network according to an embodiment of the disclosure.

Referring to FIG. 1, the mmWave communication system of the disclosure may use a geometric channel model.

A receiver 100 of the mmWave communication system may be configured to include a coupling unit 110, a channel estimation device 120, an equalizer 130, a demodulation unit 150, and a decoding unit 150.

The coupling unit 110 may obtain a received pilot signal by multiplying a combining matrix by a signal received through an antenna.

The channel estimation device 120 may perform channel estimation from pilot signals received in units of time slots, using a long short-term memory network 122 and a fully connected network 124.

The equalizer 130 may correct a distortion in the pilot signals received in units of time slots.

The demodulation unit 140 may convert a corrected signal into a discrete signal through a demodulation process.

The decoding unit 150 may obtain accurate data transmitted by a transmitter, by performing error correction (channel decoding) on a demodulated signal and decoding the demodulated signal.

The channel estimation device 120 may be configured to include the long short-term memory network 122, the fully connected network 124, and a channel reproduction unit 126.

When a received pilot signal of a time slot is input, the long short-term memory network 122 may extract a time-varying channel feature embedding vector by estimating a change state of a channel by using the received pilot signal of the time slot as an input. The long short-term memory network 122 will be further described below with reference to FIG. 2.

The fully connected network 124 may estimate a parameter of a channel model by using the time-varying channel feature embedding vector as an input. Here, the parameter of the channel model may include a departure angle, an arrival angle, a path delay, and a path gain. The fully connected network 124 will be further described below with reference to FIG. 3.

The channel reproduction unit 126 may estimate a channel for the received pilot signal of the time slot, using the parameter of the channel model.

The channel reproduction unit 126 may estimate a channel by applying the parameter of the channel model to Equation 1 shown below.

$$\hat{H}^l[k] = \sum_{i=1}^{N_p} \hat{\alpha}_i^l e^{-j2\pi k f_s \hat{\tau}_i^l} a_R\left(\hat{\theta}_i^l\right) a_T\left(\hat{\phi}_i^l\right)^* \quad \text{Equation 1}$$

Here, $\hat{H}^l[k]$ denotes an estimated channel matrix of a k-th subcarrier, $$\hat{\alpha}_i^l$$

denotes an estimated channel gain of an i-th path in an l-th time slot, $f_s$ denotes a spacing between subcarriers, $$\hat{\tau}_i^l$$

denotes an estimated path delay of the i-th path in the l-th time slot, $$\hat{\theta}_i^l$$

denotes an estimated arrival angle of the i-th path in the l-th time slot, $$\hat{\phi}_i^l$$

denotes an estimated departure angle of the i-th path in the l-th time slot, $$a_R\left(\hat{\theta}_i^l\right)$$

denotes a steering vector for the estimated departure angle of the i-th path in the l-th time slot, and $$a_T\left(\hat{\phi}_i^l\right)$$

denotes a steering vector for the estimated arrival angle of the i-th path in the l-th time slot.

A process of deriving Equation 1 is described below.

A transmitter may include "$N_T$" antennas and "$N_{RF}$" RF chains, and may transmit "M" pilot training symbols in total. Among them, a pilot signal $s_m[k]$ may be transmitted by multiplying a k-th subcarrier of an m-th symbol by a pre-coding matrix $F_m$. The receiver 100 may be assumed to include "$N_R$" antennas and "$N_{RF}$" RF chains.

The receiver 100 receives a signal $r_m[k]$ obtained by adding a noise vector $v_m[k]$ and passing through a channel H[k] to a pilot signal $F_m s_m[k]$ transmitted by the transmitter. Therefore, the signal $r_m[k]$ in a frequency domain received by the receiver 100 may be expressed as shown in Equation 2 below.

$$r_m[k] = H[k]F_m s_m[k] + v_m[k] \quad \text{Equation 2}$$

Here, H[k] denotes a channel matrix corresponding to a k-th subcarrier in a frequency domain, $F_m$ denotes a precoding matrix of an m-th symbol, $s_m[k]$ denotes a pilot signal of the k-th subcarrier of the m-th symbol in the frequency domain, and $v_m[k]$ denotes noise of the k-th subcarrier of the m-th symbol in the frequency domain.

The coupling unit 110 of the receiver 100 may obtain a combined signal $y_m[k]$ by multiplying the received signal $r_m[k]$ by a combiner matrix $W_m$. Accordingly, a final received signal $y_m[k]$ in the frequency domain may be expressed as shown in Equation 3 below.

$$y_m[k] = W_m^* H[k]F_m s_m[k] + W_m^* v_m[k] \quad \text{Equation 3}$$

Here, $W_m^*$ denotes a transpose conjugate matrix of a combiner matrix, H[k] denotes a channel matrix corresponding to a k-th subcarrier in a frequency domain, $F_m$ denotes a precoding matrix of an m-th symbol, $s_m[k]$ denotes a pilot signal of the k-th subcarrier of the m-th symbol in the frequency domain, and $v_m[k]$ denotes noise of the k-th subcarrier of the m-th symbol in the frequency domain.

In addition, if the geometric channel model is used, a channel matrix $H(\tau)$ in a time domain may be configured as shown in Equation 4 below.

$$H(\tau) = \sum_{i=1}^{N_p} \alpha_i \delta(t - \tau_i) a_R(\theta_i) a_T(\phi_i)^* \quad \text{Equation 4}$$

Here, $N_p$ denotes the number of channel paths, $\alpha_i$ denotes a channel gain of an i-th path, $\tau_i$ denotes a path delay of the i-th path, $\theta_i$ denotes an arrival angle of the i-th path, and $\phi_i$ denotes a departure angle of the i-th path. In addition, $a_R$ and $a_T$ denote steering vectors defined as shown in Equation 5 below.

$$a_R(\theta) = \frac{1}{\sqrt{N_R}}\left[1,\ e^{j\pi sin(\theta)},\ \ldots,\ e^{j\pi(N_R-1)\,sin(\theta)}\right]^T \quad \text{Equation 5}$$

$$a_T(\phi) = \frac{1}{\sqrt{N_T}}\left[1,\ e^{j\pi\,sin(\phi)},\ \ldots,\ e^{j\pi(N_T-1)\,sin(\phi)}\right]^T$$

The channel matrix $H(\tau)$ of the time domain through the channel matrix H[k] of the k-th subcarrier may be calculated from Fourier transform. Accordingly, H[k] may be expressed as shown in Equation 6 below.

$$H[k] = \sum_{i=1}^{N_p} \alpha_i e^{-j2\pi k f_s \tau_i} a_R(\theta_i) a_T(\phi_i)^* \quad \text{Equation 6}$$

Here, H[k] denotes an estimated channel matrix of a k-th subcarrier, $\alpha_i$ denotes a channel gain of an i-th path, $f_s$ denotes a spacing between subcarriers, $\tau_i$ denotes a path delay of the i-th path, $\theta_i$ denotes an arrival angle of the i-th path, $\phi_i$ denotes a departure angle of the i-th path, $a_R(\theta_i)$ denotes a steering vector for the departure angle of the i-th path, and $a_T(\phi_i)$ denotes a steering vector for the arrival angle of the i-th path.

Therefore, Equation 1 may be derived from Equation 6.

The channel estimation device 120 with an artificial intelligence neural network structure proposed in the disclosure may be trained by an Adam optimization algorithm, to minimize a loss function.

A loss function of the channel estimation device 120 with the artificial intelligence neural network structure may be defined as shown in Equation 7 below.

$$J = \frac{1}{K}\sum_{l=1}^{L}\sum_{k=1}^{K}\left\|H^l[k] - \hat{H}^l[k]\right\|_F^2 \quad \text{Equation 7}$$

Here, $\hat{H}^l[k]$ denotes a channel matrix corresponding to a k-th subcarrier and an estimated l-th time slot.

Meanwhile, since "M" training pilot symbols share the same parameters in a time domain, an input y of a long short-term memory network may be generated by concatenating them. In other words, the input y of the network may be expressed as shown in Equation 8 below by concatenating the "M" training pilot symbols.

$$y = \left[y_1^T, y_2^T, \ldots, y_m^T, \ldots, y_M^T\right]^T \quad \text{Equation 8}$$

Here, $y_m = \left[y_m[0]^T, y_m[1]^T, \ldots, y_m[k]^T, \ldots y_m[K-1]^T\right]^T$ is satisfied, which indicates a collection of all received signals for "K" subcarriers in an m-th training symbol.

To estimate a channel that changes for a period of L times over time, inputs y corresponding to L times are called $y^1$, $y^2$, . . . , $y^l$, . . . , $y^L$ in an order. Since an l-th input $y^l$ is a complex number, it may be converted into a real number and input to the long short-term memory network 122.

In other words, an input $y_{in}$ of the long short-term memory network 122 is $y_{in}=[\Re(y^l), \Im(y^l)]$, which connects a real part converted to a real number and an imaginary part.

Figure 2:
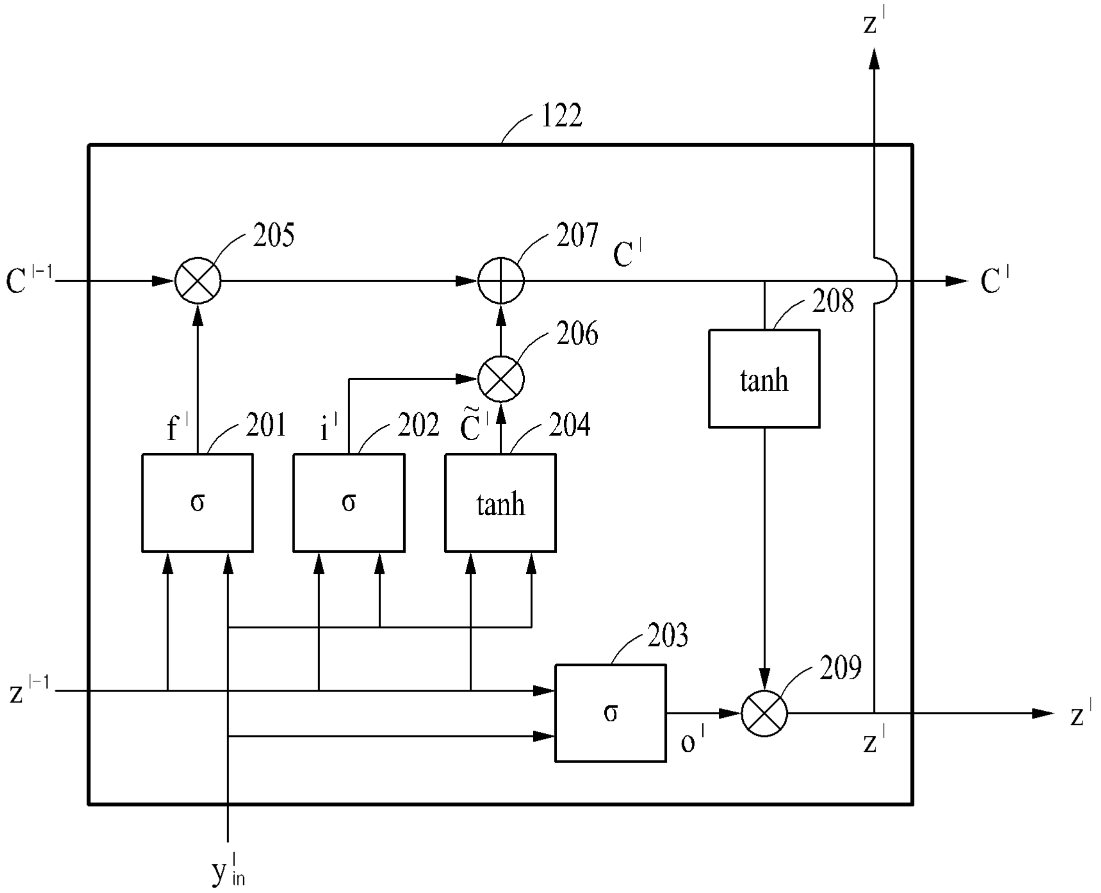
FIG. 2 illustrates a configuration of a long short-term memory network in a channel estimation device according to an embodiment of the disclosure.

FIG. 2 illustrates a configuration of a long short-term memory network in a channel estimation device according to an embodiment of the disclosure.

Referring to FIG. 2, the long short-term memory network 122 may include a forget gate $F_C$ 201, an input gate $I_C$ 202, an output gate $O_C$ 203, and hyperbolic tangents tanh 204 and 208.

The long short-term memory network 122 may calculate an output of the input gate 202 that determines a degree to which a candidate state information cell is reflected in a final state information cell based on a received pilot signal of a time slot and an output of the long short-term memory network of a previous time slot. Here, the output of the input gate 202 may be calculated as shown in Equation 9 below.

$$I_C = \sigma\left(W_I y_{in}^l + U_I z^{l-1} + b_I\right) \quad \text{Equation 9}$$

Here, $I_C$ denotes an output of an input gate, σ denotes a sigmoid function, $W_I$ and $U_I$ denote weight matrices of the input gate, $b_I$ denotes a deviation of the input gate, $$y_{in}^l$$

denotes an input of an l-th time slot, and $z^{l-1}$ denotes an output of the long short-term memory network of an (l−1)-th time slot.

The long short-term memory network 122 may calculate the forget gate 201 that determines a degree to which a final state information cell of the previous time slot is reflected in the final state information cell based on the received pilot signal of the time slot and the output of the long short-term memory network of the previous time slot. Here, an output of the forget gate 201 may be calculated as shown in Equation 10 below.

$$F_C = \sigma\left(W_F y_{in}^l + U_F z^{l-1} + b_F\right) \quad \text{Equation 10}$$

Here, $F_C$ denotes an output of a forget gate, σ denotes a sigmoid function, $W_F$ and $U_F$ denote weight matrices of the forget gate, $b_F$ denotes a deviation of the forget gate, $$y_{in}^l$$

denotes an input of an l-th time slot, and $z^{l-1}$ denotes an output of the long short-term memory network of an (l−1)-th time slot.

The long short-term memory network 122 may calculate an output of the output gate 203 that determines a degree to which the final state information cell is reflected in an output of the long short-term memory network based on the received pilot signal of the time slot and the output of the long short-term memory network of the previous time slot. Here, the output of the output gate 203 may be calculated as shown in Equation 11 below.

$$O_C = \sigma\left(W_O y_{in}^l + U_O z^{l-1} + b_O\right) \quad \text{Equation 11}$$

Here, $O_C$ denotes an output of an output gate, σ denotes a sigmoid function, $W_O$ and $U_O$ denote weight matrices of the output gate, $b_O$ denotes a deviation of the output gate, $$y_{in}^l$$

denotes an input of an l-th time slot, and $z^{l-1}$ denotes an output of the long short-term memory network of an (l−1)-th time slot.

The long short-term memory network 122 may calculate the candidate state information cell based on the received pilot signal of the time slot and the output of the long short-term memory network of the previous time slot, using the hyperbolic tangent 204. Here, the candidate state information cell may be calculated as shown in Equation 12 below.

$$\tilde{C} = \tanh\left(W_C y_{in}^l + U_C z^{l-1} + b_C\right) \quad \text{Equation 12}$$

Here, $\tilde{C}$ denotes a value of the candidate state information cell, tanh( ) denotes a hyperbolic tangent function, $W_C$ and $U_C$ denote weight matrices of the candidate state information cell, $b_C$ denotes a deviation of the candidate state information cell, $y_{in}^l$ denotes an input of an l-th time slot, and $z^{l-1}$ denotes an output of the long short-term memory network of an (l−1)-th time slot.

The long short-term memory network 122 may calculate the final state information cell by adding, using an adder 207, a value obtained by multiplying the output of the forget gate 201 by the final state information cell of the previous time slot using a first multiplier 205 and a value obtained by multiplying the output of the input gate 202 by the candidate state information cell using a second multiplier 206. Here, the final state information cell may be calculated as shown in Equation 13 below.

$$C^l = F_C \circ C^{l-1} + I_C \circ \tilde{C} \qquad \text{Equation 13}$$

Here, $C^l$ denotes a value of the final state information cell of an l-th time slot, $F_C$ denotes an output of a forget gate, $C^{l-1}$ denotes a value of the final state information cell of an (l−1)-th time slot, $I_C$ denotes an output of an input gate, and $\tilde{C}$ denotes a value of a candidate state information cell.

The long short-term memory network 122 may calculate and output a time-varying channel feature embedding vector by multiplying an output gate by a value obtained by applying the hyperbolic tangent 208 to the final state information cell using a third multiplier 209. Here, the time-varying channel feature embedding vector may be calculated as shown in Equation 14 below.

$$z^l = O_C \circ \tanh(C^l) \qquad \text{Equation 14}$$

Here, $z^l$ denotes a time-varying channel feature embedding vector of an l-th time slot, $O_C$ denotes an output of an output gate, tank( ) denotes a hyperbolic tangent function, and $C^l$ denotes a value of the final state information cell of an l-th time slot.

Figure 3:
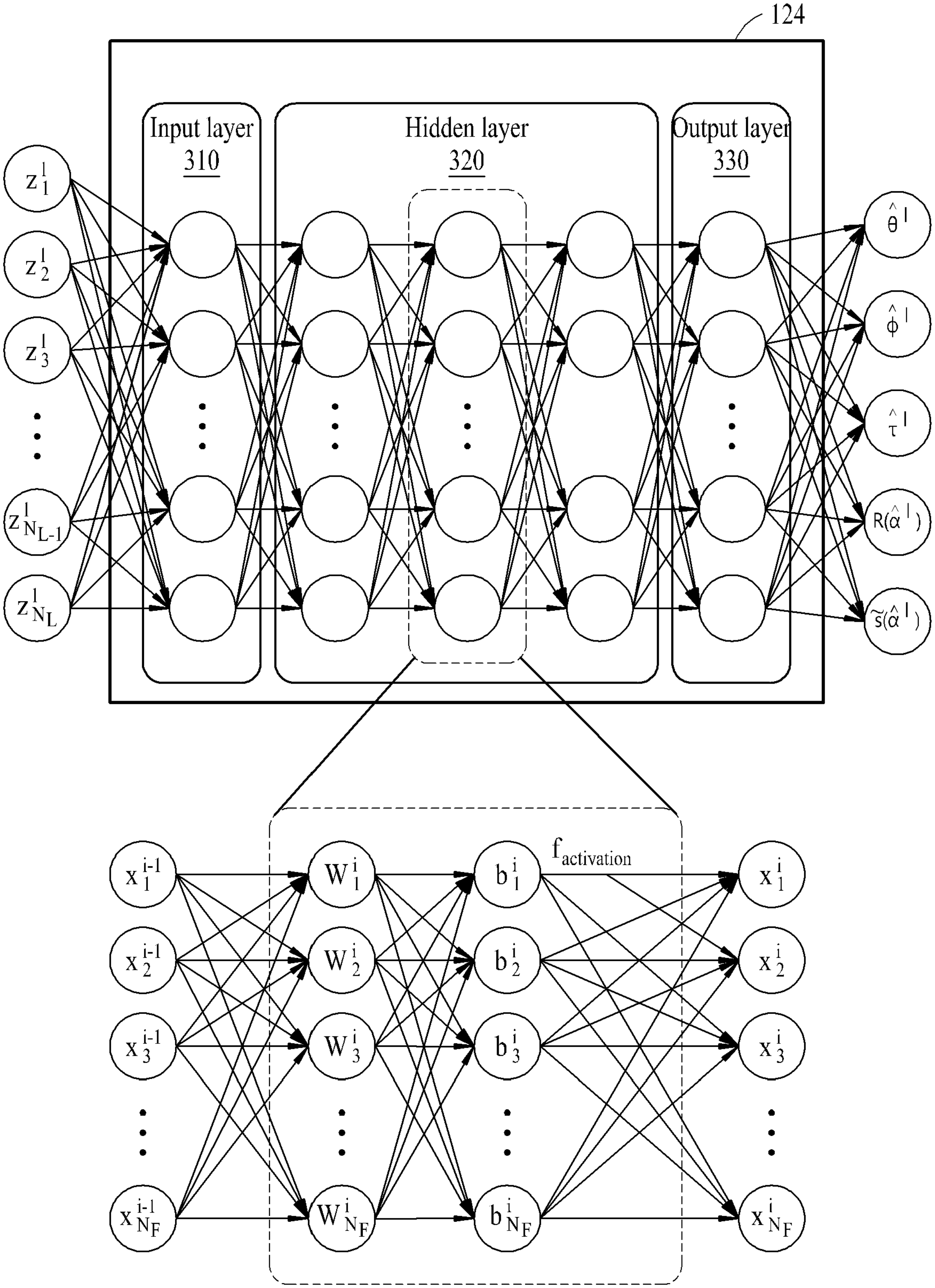
FIG. 3 illustrates a configuration of a fully connected network in a channel estimation device according to an embodiment of the disclosure.

FIG. 3 illustrates a configuration of a fully connected network in a channel estimation device according to an embodiment of the disclosure.

Referring to FIG. 3, the fully connected network 124 may estimate a parameter of a channel model by matching a time-varying channel feature embedding vector $z^l$ and the parameter of the channel model, using an input layer 310, at least one hidden layer 320, and an output layer 330.

The input layer 310 may function to adjust a time-varying channel feature embedding vector to a dimension of the hidden layer 320.

The input layer 310 may output a value calculated by Equation 15 shown below.

$$x^0 = f_{activation}(W_0 z^l + b_0) \qquad \text{Equation 15}$$

Here, $x^0$ denotes an output of an input layer, $W_0$ denotes a weight matrix of the input layer, $b_0$ denotes a deviation of the input layer, $z^l$ denotes a time-varying channel feature embedding vector that is an output of a long short-term memory network, and $f_{activation}$ denotes an activation function.

The output $x^0$ of the input layer 310 is input to "$N_{hidden}$" hidden layers 320.

The hidden layer 320 may output a value calculated by Equation 16 shown below.

$$x^i = f_{activation}(W_i x^{i-1} + b_i) \qquad \text{Equation 16}$$

Here, $x^i$ denotes an output of an i-th hidden layer, $W_i$ denotes a weight of the i-th hidden layer, $b_i$ denotes a deviation of the i-th hidden layer, and $f_{activation}$ denotes an activation function used in each hidden layer.

An output $x^{N_{hidden}}$ passing through the hidden layer 320 with "$N_F$" dimensions in total calculates a channel parameter through an output layer that is the last layer of the fully connected network, which will be described below.

The output layer 330 may output a value calculated by Equation 17 shown below.

$$\Psi^l = \tanh(W_{out} x^{N_{hidden}} + b_{out}) \qquad \text{Equation 17}$$

Here, $\Psi^l$ denotes a final output that yields estimates of a departure angle, an arrival angle, a path delay, and a path gain for each channel path in an l-th time slot, tanh( ) denotes a hyperbolic tangent function, $W_{out}$ denotes a weight of an output layer, $x^{N_{hidden}}$ denotes a final output of a hidden layer input to the output layer, and $b_{out}$ denotes a deviation of the output layer.

In other words, $\Psi^l$ corresponds to estimates $\hat{\phi}^l$, $\hat{\theta}^l$, $\hat{\tau}^l$, and $\hat{\alpha}^l$ of the departure angle, the arrival angle, the path delay, and the path gain in the l-th time slot. Here, the estimate $\hat{\alpha}^l$ of the path gain includes a real part $\Re(\hat{\alpha}^l)$ and an imaginary part $\Im(\hat{\alpha}^l)$.

Hereinafter, a method according to the disclosure configured as described above will be described with reference to the drawings.

Figure 4:
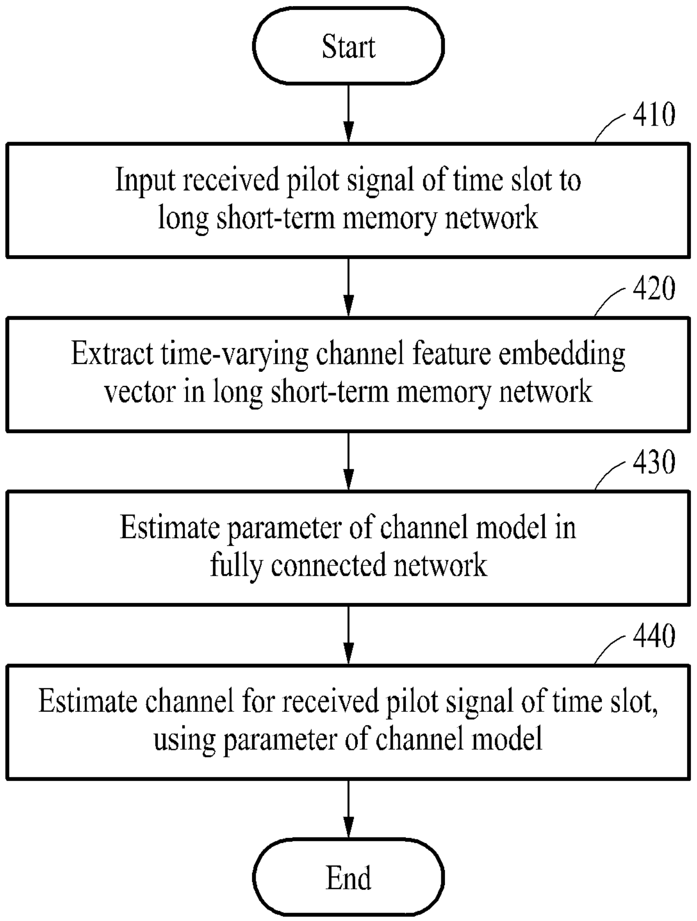
FIG. 4 illustrates a process of estimating a channel in a channel estimation device according to an embodiment of the disclosure.

FIG. 4 illustrates a process of estimating a channel in a channel estimation device according to an embodiment of the disclosure.

Referring to FIG. 4, a channel estimation device inputs a received pilot signal of a time slot to a long short-term memory network in operation 410. Here, the received pilot signal of the time slot may be converted into a real number and input to the long short-term memory network.

In operation 420, the long short-term memory network of the channel estimation device may extract a time-varying channel feature embedding vector by estimating a change state of a channel by using the received pilot signal of the time slot as an input.

In operation 420, the long short-term memory network may extract the time-varying channel feature embedding vector, using the received pilot signal of the time slot, a final state information cell of the long short-term memory network of a previous time slot, and an output of the long short-term memory network of the previous time slot. An operation of the long short-term memory network will be further described below with reference to FIG. 5.

In operation 430, a fully connected network of the channel estimation device may estimate a parameter of a channel model by using the time-varying channel feature embedding vector as an input. Here, the parameter of the channel model may include a departure angle, an arrival angle, a path delay, and a path gain.

In operation 430, the fully connected network may estimate the parameter of the channel model by matching the time-varying channel feature embedding vector and the parameter of the channel model, using an input layer, at least one hidden layer, and an output layer.

In operation 440, the channel estimation device may estimate a channel for the received pilot signal of the time slot, using the parameter of the channel model.

In operation 440, the channel estimation device may perform estimation by applying the parameter of the channel model to Equation 1 described above.

Figure 5:
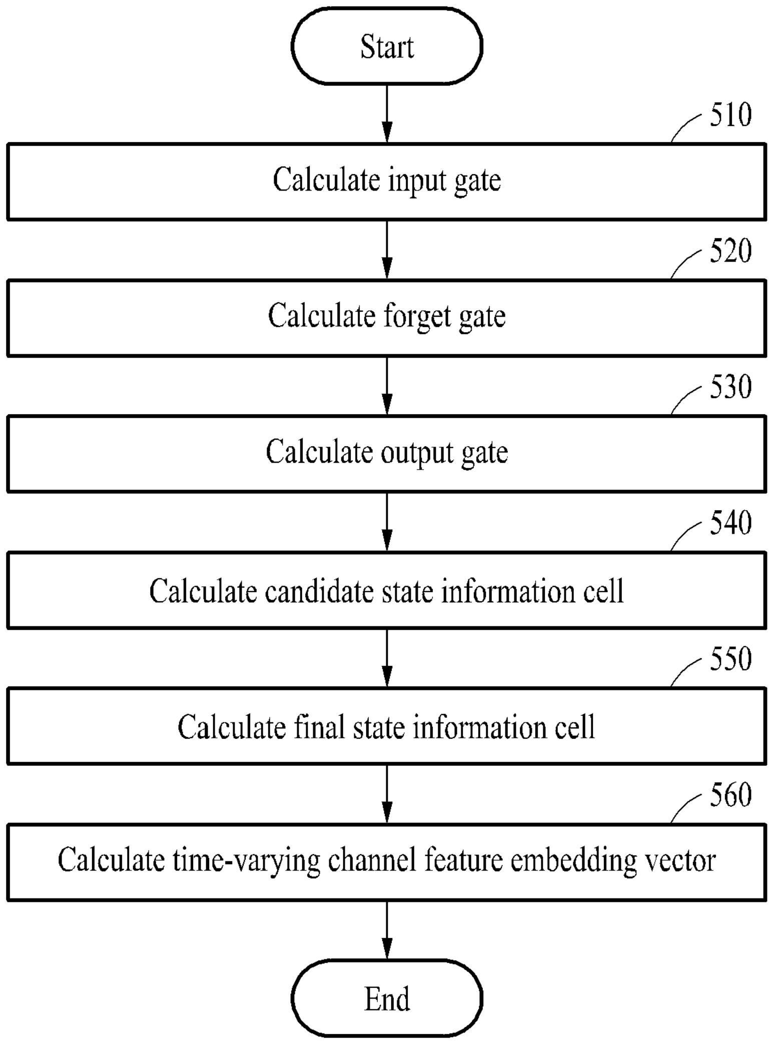
FIG. 5 illustrates a process of calculating a time-varying channel feature embedding vector in a long short-term memory network of a channel estimation device according to an embodiment of the disclosure.

FIG. 5 illustrates a process of calculating a time-varying channel feature embedding vector in a long short-term memory network of a channel estimation device according to an embodiment of the disclosure.

Referring to FIG. 5, in operation 510, the long short-term memory network may calculate an output of an input gate that determines a degree to which a candidate state information cell is reflected in a final state information cell based on a received pilot signal of a time slot and an output of the long short-term memory network of a previous time slot.

In operation 520, the long short-term memory network may calculate an output of a forget gate that determines a degree to which a final state information cell of the previous time slot is reflected in the final state information cell based on the received pilot signal of the time slot and the output of the long short-term memory network of the previous time slot.

In operation 530, the long short-term memory network may calculate an output of an output gate that determines a degree to which the final state information cell is reflected in an output of the long short-term memory network based on the received pilot signal of the time slot and the output of the long short-term memory network of the previous time slot.

In operation 540, the long short-term memory network may calculate the candidate state information cell based on the received pilot signal of the time slot and the output of the long short-term memory network of the previous time slot.

In operation 550, the long short-term memory network may calculate the final state information cell by adding a value obtained by multiplying the output of the forget gate by the final state information cell of the previous time slot and a value obtained by multiplying the output of the input gate by the candidate state information cell.

In operation 560, the long short-term memory network may calculate and output the time-varying channel feature embedding vector by multiplying the output of the output gate by a value obtained by applying a hyperbolic tangent to the final state information cell.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A channel estimation method performed by a channel estimation device, the channel estimation method comprising:

inputting, by the channel estimation device, a received pilot signal of a time slot to a long short-term memory network;

extracting, by the channel estimation device, a time-varying channel feature embedding vector by estimating a change state of a channel by using the received pilot signal of the time slot as an input in the long short-term memory network;

estimating, by the channel estimation device, a parameter of a channel model by using the time-varying channel feature embedding vector as an input by using a fully connected network; and estimating, by the channel estimation device, a channel for the received pilot signal of the time slot, using the parameter of the channel model, wherein the long short-term memory network is separate from the fully connected network.

2. The channel estimation method of claim 1, wherein the parameter of the channel model comprises a departure angle, an arrival angle, a path delay, and a path gain.

3. The channel estimation method of claim 1, wherein the received pilot signal of the time slot is converted into a real number and input to the long short-term memory network.

4. The channel estimation method of claim 1, wherein the extracting of the time-varying channel feature embedding vector by estimating the change state of the channel by using the received pilot signal of the time slot as the input in the long short-term memory network comprises extracting the time-varying channel feature embedding vector using the received pilot signal of the time slot, a final state information cell of the long short-term memory network of a previous time slot, and an output of the long short-term memory network of the previous time slot in the long short-term memory network.

5. The channel estimation method of claim 1, wherein the extracting of the time-varying channel feature embedding vector by estimating the change state of the channel by using the received pilot signal of the time slot as the input in the long short-term memory network comprises:

calculating an output of an input gate that determines a degree to which a candidate state information cell is reflected in a final state information cell based on the received pilot signal of the time slot and an output of the long short-term memory network of a previous time slot;

calculating an output of a forget gate that determines a degree to which a final state information cell of the previous time slot is reflected in the final state information cell based on the received pilot signal of the time slot and the output of the long short-term memory network of the previous time slot;

calculating an output of an output gate that determines a degree to which the final state information cell is reflected in an output of the long short-term memory network based on the received pilot signal of the time slot and the output of the long short-term memory network of the previous time slot;

calculating the candidate state information cell based on the received pilot signal of the time slot and the output of the long short-term memory network of the previous time slot;

calculating the final state information cell by adding a value obtained by multiplying the output of the forget gate by the final state information cell of the previous time slot and a value obtained by multiplying the output of the input gate by the candidate state information cell; and calculating and outputting the time-varying channel feature embedding vector by multiplying the output of the output gate by a value obtained by applying a hyperbolic tangent to the final state information cell.

6. The channel estimation method of claim 1, wherein the estimating of the parameter of the channel model by using the time-varying channel feature embedding vector as the input by using the fully connected network comprises estimating the parameter of the channel model by matching the time-varying channel feature embedding vector and the parameter of the channel model, using an input layer, at least one hidden layer, and an output layer in the fully connected network.

7. The channel estimation method of claim 6, wherein the input layer outputs a value calculated by the following equation:

$$x^0 = f_{activation}(W_0 z^l + b_0)$$

in which $x^0$ denotes an output of the input layer, $W_0$ denotes a weight matrix of the input layer, $b_0$ denotes a deviation of the input layer, $z^l$ denotes the time-varying channel feature embedding vector that is an output of the long short-term memory network, and $f_{activation}$ denotes an activation function.

8. The channel estimation method of claim 6, wherein the hidden layer outputs a value calculated by the following equation:

$$x^i = f_{activation}(W_i x^{i-1} + b_i)$$

in which $x^i$ denotes an output of an i-th hidden layer, $W_i$ denotes a weight of the i-th hidden layer, $b_i$ denotes a deviation of the i-th hidden layer, and $f_{activation}$ denotes an activation function used in each hidden layer.

9. The channel estimation method of claim 6, wherein the output layer outputs a value calculated by the following equation:

$$\Psi^l = \tanh(W_{out} x^{N_{hidden}} + b_{out})$$

in which $\Psi^l$ denotes a final output that yields estimates of a departure angle, an arrival angle, a path delay, and a path gain for each channel path in an l-th time slot, tanh( ) denotes a hyperbolic tangent function, $W_{out}$ denotes a weight of an output layer, $x^{N_{hiddn}}$ denotes a final output of a hidden layer input to an output layer, and $b_{out}$ denotes a deviation of an output layer.

10. The channel estimation method of claim 1, wherein the estimating of the channel for the received pilot signal of the time slot, using the parameter of the channel model performs estimation by applying the parameter of the channel model to the following equation:

$$\hat{H}^l[k] = \sum_{i=1}^{N_p} \hat{\alpha}_i^l e^{-j2\pi k f_s \hat{\tau}_i^l} a_R(\hat{\theta}_i^l) a_T(\hat{\phi}_i^l)^*$$

in which $\hat{H}^l[k]$ denotes an estimated channel matrix of a k-th subcarrier, $$\hat{\alpha}_i^l$$

denotes an estimated channel gain of an i-th path in an l-th time slot, $f_s$ denotes a spacing between subcarriers, $$\hat{\tau}_i^l$$

denotes an estimated path delay of the i-th path in the l-th time slot, $$\hat{\theta}_i^l$$

denotes an estimated arrival angle of the i-th path in the l-th time slot, $$\hat{\phi}_i^l$$

denotes an estimated departure angle of the i-th path in the l-th time slot, $$a_R(\hat{\theta}_i^l)$$

denotes a steering vector for the estimated departure angle of the i-th path in the l-th time slot, and $$a_T(\hat{\phi}_i^l)$$

denotes a steering vector for the estimated arrival angle of the i-th path in the l-th time slot.

11. A channel estimation device, the channel estimation device comprising:

memory storing one or more computer programs; and one or more processors communicatively coupled to the memory, wherein the one or more computer programs include computer-executable instructions that, when executed by the one or more processors, cause the channel estimation device to:

when a received pilot signal of a time slot is input, extract, by a long short-term memory network, a time-varying channel feature embedding vector by estimating a change state of a channel by using the received pilot signal of the time slot as an input, estimate, by a fully connected network, a parameter of a channel model by using the time-varying channel feature embedding vector as an input, and estimate, by a channel reproduction unit, a channel for the received pilot signal of the time slot, using the parameter of the channel model, wherein the long short-term memory network is separate from the fully connected network.

12. The channel estimation device of claim 11, wherein the received pilot signal of the time slot is converted into a real number and input to the long short-term memory network.

13. The channel estimation device of claim 11, wherein the one or more computer programs further include computer-executable instructions that, when executed by the one or more processors, cause the channel estimation device to extract, by the long short-term memory network, the time-varying channel feature embedding vector using the received pilot signal of the time slot, a final state information cell of the long short-term memory network of a previous time slot, and an output of the long short-term memory network of the previous time slot in the long short-term memory network.

14. The channel estimation device of claim 11, wherein the one or more computer programs further include computer-executable instructions that, when executed by the one or more processors, cause the channel estimation device to:

calculate, by the long short-term memory network, an output of an input gate that determines a degree to which a candidate state information cell is reflected in a final state information cell based on the received pilot signal of the time slot and an output of the long short-term memory network of a previous time slot, calculate, by the long short-term memory network, an output of a forget gate that determines a degree to which a final state information cell of the previous time slot is reflected in the final state information cell based on the received pilot signal of the time slot and the output of the long short-term memory network of the previous time slot, calculate, by the long short-term memory network, an output of an output gate that determines a degree to which the final state information cell is reflected in an output of the long short-term memory network based on the received pilot signal of the time slot and the output of the long short-term memory network of the previous time slot, calculate, by the long short-term memory network, the candidate state information cell based on the received pilot signal of the time slot and the output of the long short-term memory network of the previous time slot, calculate, by the long short-term memory network, the final state information cell by adding a value obtained by multiplying the output of the forget gate by the final state information cell of the previous time slot and a value obtained by multiplying the output of the input gate by the candidate state information cell, and calculate and output, by the long short-term memory network, the time-varying channel feature embedding vector by multiplying the output of the output gate by a value obtained by applying a hyperbolic tangent to the final state information cell.

15. The channel estimation device of claim 11, wherein the one or more computer programs further include computer-executable instructions that, when executed by the one or more processors, cause the channel estimation device to estimate, by the fully connected network, the parameter of the channel model by matching the time-varying channel feature embedding vector and the parameter of the channel model, using an input layer, at least one hidden layer, and an output layer in the fully connected network.

16. One or more non-transitory computer-readable storage media storing one or more computer programs including computer-executable instructions that, when executed by one or more processors of a channel estimation device, cause the channel estimation device to perform operations, the operations comprising:

inputting, by the channel estimation device, a received pilot signal of a time slot to a long short-term memory network;

extracting, by the channel estimation device, a time-varying channel feature embedding vector by estimating a change state of a channel by using the received pilot signal of the time slot as an input in the long short-term memory network;

estimating, by the channel estimation device, a parameter of a channel model by using the time-varying channel feature embedding vector as an input by using a fully connected network; and estimating, by the channel estimation device, a channel for the received pilot signal of the time slot, using the parameter of the channel model, wherein the long short-term memory network is separate from the fully connected network.

17. The one or more non-transitory computer-readable storage media of claim 16, wherein the received pilot signal of the time slot is converted into a real number and input to the long short-term memory network.

18. The one or more non-transitory computer-readable storage media of claim 16, the operations further comprising:

extracting the time-varying channel feature embedding vector using the received pilot signal of the time slot, a final state information cell of the long short-term memory network of a previous time slot, and an output of the long short-term memory network of the previous time slot in the long short-term memory network.

19. The one or more non-transitory computer-readable storage media of claim 16, the operations further comprising:

calculating an output of an input gate that determines a degree to which a candidate state information cell is reflected in a final state information cell based on the received pilot signal of the time slot and an output of the long short-term memory network of a previous time slot;

calculating an output of a forget gate that determines a degree to which a final state information cell of the previous time slot is reflected in the final state information cell based on the received pilot signal of the time slot and the output of the long short-term memory network of the previous time slot;

calculating an output of an output gate that determines a degree to which the final state information cell is reflected in an output of the long short-term memory network based on the received pilot signal of the time slot and the output of the long short-term memory network of the previous time slot;

calculating the candidate state information cell based on the received pilot signal of the time slot and the output of the long short-term memory network of the previous time slot;

calculating the final state information cell by adding a value obtained by multiplying the output of the forget gate by the final state information cell of the previous time slot and a value obtained by multiplying the output of the input gate by the candidate state information cell; and calculating and outputting the time-varying channel feature embedding vector by multiplying the output of the output gate by a value obtained by applying a hyperbolic tangent to the final state information cell.

20. The one or more non-transitory computer-readable storage media of claim 16, the operations further comprising:

estimating the parameter of the channel model by matching the time-varying channel feature embedding vector and the parameter of the channel model, using an input layer, at least one hidden layer, and an output layer in the fully connected network.

* * * * *